US011319398B2

(12) United States Patent
Müller et al.

(10) Patent No.: US 11,319,398 B2
(45) Date of Patent: *May 3, 2022

(54) METHOD FOR THE PRODUCTION OF POLYOXAZOLIDINONE POLYMER COMPOUNDS

(71) Applicant: COVESTRO DEUTSCHLAND AG, Leverkusen (DE)

(72) Inventors: Thomas Ernst Müller, Aachen (DE); Christoph Gürtler, Cologne (DE); Carsten Koopmans, Hilden (DE); Volker Marker, Burscheid (DE); Claudine Rangheard, Munich (DE); Walter Leitner, Aachen (DE)

(73) Assignee: Covestro Deutschland AG, Leverkusen (DE)

( * ) Notice: Subject to any disclaimer, the term of this patent is extended or adjusted under 35 U.S.C. 154(b) by 444 days.

This patent is subject to a terminal disclaimer.

(21) Appl. No.: 16/481,115

(22) PCT Filed: Jan. 30, 2018

(86) PCT No.: PCT/EP2018/052268
§ 371 (c)(1),
(2) Date: Jul. 26, 2019

(87) PCT Pub. No.: WO2018/141743
PCT Pub. Date: Aug. 9, 2018

(65) Prior Publication Data
US 2021/0130527 A1   May 6, 2021

(30) Foreign Application Priority Data
Feb. 2, 2017 (EP) ..................................... 17154416

(51) Int. Cl.
| C08G 18/00 | (2006.01) |
| C08G 18/16 | (2006.01) |
| C08G 18/28 | (2006.01) |
| C08G 18/76 | (2006.01) |
| C08G 18/80 | (2006.01) |
| C08G 73/06 | (2006.01) |

(52) U.S. Cl.
CPC ......... *C08G 18/003* (2013.01); *C08G 18/161* (2013.01); *C08G 18/282* (2013.01); *C08G 18/7671* (2013.01); *C08G 18/8064* (2013.01); *C08G 73/06* (2013.01)

(58) Field of Classification Search
None
See application file for complete search history.

(56) References Cited

U.S. PATENT DOCUMENTS

| 2,964,794 | A | 12/1960 | Peilstocker et al. |
| 4,495,345 | A | 1/1985 | Kawakami et al. |
| 4,631,306 | A | 12/1986 | Markert et al. |
| 5,237,004 | A | 8/1993 | Wu et al. |
| 5,237,021 | A | 8/1993 | Ishii et al. |
| 5,672,645 | A | 9/1997 | Eckel et al. |
| 6,265,533 | B1 | 7/2001 | Regel et al. |
| 2013/0269985 | A1* | 10/2013 | Tahara ................. C08G 18/282 174/251 |
| 2015/0291726 | A1* | 10/2015 | Mueller ................. C08G 18/71 528/56 |
| 2017/0081459 | A1 | 3/2017 | Muller et al. |
| 2017/0088659 | A1 | 3/2017 | Muller et al. |
| 2018/0022871 | A1* | 1/2018 | Muller ................. C08G 18/003 528/51 |

FOREIGN PATENT DOCUMENTS

| DE | 1031507 B | 6/1958 |
| DE | 1785137 A | 1/1972 |
| EP | 0634445 A | 1/1995 |
| GB | 905072 A | 9/1962 |
| GB | 1592724 A | 7/1981 |
| WO | WO-2015173101 A1 * | 11/2015 ........... C08G 18/758 |
| WO | WO-2016128380 A1 * | 8/2016 ......... C08G 18/8064 |

OTHER PUBLICATIONS

International Search Report, PCT/EP2018/052268, dated Mar. 15, 2018.
Dyen, M.E. and Swern, D., 2-Oxazolidones, Chemical Reviews, vol. 67, No. 2, p. 197-246, Apr. 1, 1967 (abstract).
Iwakura, Yoshio et al, Polyoxazolidones prepared from bisurethans and bisepoxies, J. Polym. Sci., vol. 4, p. 751-760, Apr. 1966 (abstract).
Peterson, Paul E. et al., Analysis of the Swain-Moseley-Bown equation and comparison of the results with nucleophilicities derived from halonium ion reactions, J. Am. Chem. Soc., vol. 99, No. 24, p. 7968-7976, Nov. 1, 1977 (abstrac).

* cited by examiner

*Primary Examiner* — Christopher M Rodd
(74) *Attorney, Agent, or Firm* — Donald R. Palladino; N. Denise Brown

(57) ABSTRACT

Method for the production of polyoxazolidinone compounds, comprising the reaction of at least one biscarbamate compound (A) with at least one bisepoxide compound (B) in the presence of at least one base (D), at least one Lewis acid catalyst (E), and optionally at least one compound (C), wherein the compound (C) comprising a mono-carbamate group, a mono-isocyanate group and/or a mono-epoxide group, and wherein the base (D) having a pKb-value of ≤9. The invention is also related to the resulting polyoxazolidinone compounds.

15 Claims, No Drawings

METHOD FOR THE PRODUCTION OF POLYOXAZOLIDINONE POLYMER COMPOUNDS

CROSS-REFERENCE TO RELATED APPLICATIONS

This application is a national stage application under 35 U.S.C. § 371 of PCT/EP2018/052268, filed Jan. 30, 2018, which claims the benefit of European Application No. 17154416.6, filed on Feb. 2, 2017, both of which are incorporated by reference herein.

FIELD

Method for the production of polyoxazolidinone compounds, comprising the reaction of at least one biscarbamate compound (A) with at least one bisepoxide compound (B) in the presence of at least one base (D), at least one Lewis acid catalyst (E), and optionally at least one compound (C), wherein the compound (C) comprising a mono-carbamate group, a mono-isocyanate group and/or a mono-epoxide group, and wherein the base (D) having a pKb-value of ≤9. The invention is also related to the resulting polyoxazolidinone compounds.

BACKGROUND

Oxazolidinones are widely used structural motifs in pharmaceutical applications and the cycloaddition of epoxides and isocyanates seems to be a convenient one-pot synthetic route to it. Expensive catalysts, reactive polar solvents, long reaction times and low chemoselectivities are common in early reports for the synthesis of oxazolidinones (M. E. Dyen and D. Swern, *Chem. Rev.*, 67, 197, 1967). Due to these disadvantages there was the need for alternative methods for the production of oxazolidinones especially for application of oxazolidinones as structural motif in polymer applications.

EP 0 530 812 A1 discloses the preparation of thermosetting resinous compositions by the reaction of the monofunctional ethyl carbamate with mono- or poly-functional epoxides at a reaction temperature of 130° C. The formed oxazolidinone moiety is a terminal and/or pendant group, which reacts in situ with amines to form polymeric urea repeating units in a thermosetting polymer. The oxazolidinone intermediate comprises an N—H functional group, which reduces the thermal and chemical stability of the oxazolidinone intermediate. The thermosetting polymer formed in the reaction with amines does not soften or melt.

European Patent Application No. 12192611.7 relates to a method for the production of oxazolidinone and polyoxazolidinone compounds, comprising the step of reacting an isocyanate compound with an epoxide compound in the presence of a Lewis acid catalyst. An antimony catalyst ($Ph_4SbBr$) was used as Lewis acidic catalyst, which has certain toxicity. The isocyanate has to be synthesised in a preceding step and requires additional safety measures due to the high reactivity of isocyanates. A mixture of the 5-oxazolidinone and 4-oxazolidinone regioisomers was obtained, which gives a less defined product mixture. The reaction of biscarbamates with bisepoxides in the presence of a base has not been disclosed in this patent application.

US 2013/0269985 describes the synthesis of polyoxazolidinones from bisepoxides and biscarbamates by using basic catalysts. The polyoxazolidinone is carbamate terminated which gives rise to thermal instability. The use of a compound (C) has not been disclosed.

The paper J. Polym. Sci. 4 (1966) 751-760 discloses polyoxazolidinones prepared from bisurethanes (biscarbamates) and bisepoxides. Although a high catalyst concentration of 18 mol % was used, long reaction times of 5-30 h were required. The polymers precipitated before a high molecular weight was reached and gradually decomposed at 250-300° C. The homo-polymerisation of the epoxide was observed as side reaction. The use of a compound (C) has not been disclosed.

SUMMARY

Objective of the present invention was therefore to identify an optimized process for the preparation of polyoxazolidinones, by the polycondensation route and especially to develop a suitable catalyst system, having a slightly increased dynamic viscosity in solution by controlling the regioselctivity of the 5-oxazolidinone and 4-oxazolidinone regioisomers compared to standard preparation methods since an increased dynamic viscosity is beneficial for the preparation of polyoxazolidinones fibers via wet spinning or dry-jet wet spinning.

In addition, the latter catalyst systems should also have a high reactivity to establish an economic process and a high selectivity towards polyoxazolidinones to minimize costs for downstreaming and optimize the performance of resulting polyoxazolidinones. In particular, higher thermostability than the already known polyoxazolidinones which are useful as thermoplastic material (higher decomposition temperature $T_{Donset}$ should be obtained.

Surprisingly this object has been achieved by a method for the production of polyoxazolidinone compounds, comprising the reaction of at least one biscarbamate compound (A) with at least one bisepoxide compound (B) in the presence of at least one base (D), at least one Lewis acid catalyst (E), and optionally at least one compound (C), wherein the compound (C) comprising a mono-carbamate group, a mono-isocyanate group and/or a mono-epoxide group, and wherein the base (D) having a pKb-value of ≤9.

In one embodiment of the invention the (α) The biscarbamate compound (A) is added to the bisepoxide compound (B) in a continuous or step-wise manner with two or more individual addition steps in the step-wise addition and in each individual addition step the amount of biscarbamate compound (A) added is ≥0.1 weight-% to ≤50 weight-% of the total amount of the biscarbamate compound (A) to be added or (β) the biscarbamate compound (A) and the bisepoxide compound (B) are added at the same time to the reactor optionally comprising the least one base (D) and at least one Lewis acid catalyst (E), and/or a solvent in a continuous or step-wise manner with two or more individual addition steps in the step-wise addition or (γ) the biscarbamate compound (A), the bisepoxide compound (B), optionally the compound (C), the base (D), and the Lewis acid catalyst (E) and, if applicable, a solvent are charged in a reactor and the reaction runs until full conversion is obtained.

The reaction of the bisepoxide (B) with the biscarbamate (A) may be carried out in a continuous process, in a batch process or in a semi-batch process.

In one embodiment of the method according to the invention, the process is carried out continuously. That means in this continuous process the biscarbamate compound (A), the bisepoxide compound (B), optionally the compound (C), the base (D), and the Lewis acid catalyst (E) and, if applicable, a solvent are continuously added whereas a part of the reaction mixture is continuously removed from the reactor. A residence-time reactor may be added after the continuously reactor in order to complete the reaction.

In an alternative embodiment of the method according to the invention, the process is carried out as a batch process. In this batch process the biscarbamate compound (A), the bisepoxide compound (B), optionally the compound (C), the base (D), and the Lewis acid catalyst (E) and, if applicable, a solvent are charged in a reactor and the reaction runs until full conversion is obtained. In an alternative procedure, the compound (C) can be added during the reaction or after the reaction between the bisepoxide compound (B) and biscarbamate has been completed. In a preferred embodiment the compound (C) is added after the reaction between the bisepoxide compound (B) and biscarbamate (A) has been completed.

In an alternative embodiment of the method according to the invention, a semi-batch process is preferred. The bisepoxide compound (B) is preferably mixed with a catalyst and optionally a solvent and/or the compound (C) in a reactor and the biscarbamate compound (A) and possibly compound (C) are continuously added to the reaction as pure material or in solution. The added amount of biscarbamate compound (A) is calculated so that the desired molecular weight is achieved. In an alternative embodiment, the biscarbamate compound (A) is charged in the reactor along with the catalyst and optionally the compound (C) and/or solvents while the bisepoxide compound (B) and possibly compound (C) are continuously added to the reaction mixture as a pure substance or in solution.

In an alternative embodiment the biscarbamate compound (A) is added to the bisepoxide compound (B) in a continuous or step-wise manner with two or more individual addition steps in the step-wise addition. This is to be understood in such a way that during the course of the reaction the biscarbamate compound (A) is added continuously or in the aforementioned step-wise manner.

Included is also the case that the biscarbamate compound (A) is added via a pump, dripping funnel or other continuous or semi-continuous devices where the biscarbamate compound (A) is brought into the reaction mixture in slow manner. Although some after-reaction time may be given to the reaction system, the reaction should be essentially complete shortly after the end of the addition of the biscarbamate compound (A) and the compound (C).

DETAILED DESCRIPTION

Biscarbamate Compound (A)

In a preferred embodiment of the invention the biscarbamate compound (A) is selected from the group consisting of N,N'-tetramethylene biscarbamate, N,N'-hexamethylene biscarbamate, N,N'-(2-methylpentamethylene) biscarbamate, N,N'-2,2,4-trimethyl-hexamethylene biscarbamate, N,N'-dodecanemethylene biscarbamate, N,N'-cyclohexane-1,4-biscarbamate, N,N'-isophorone biscarbamate, N,N'-(4,4'-methylenebis(cyclohexane-4,1-diyl)biscarbamate, N,N'-diphenylmethane biscarbamate, N,N'-(4,4'-methylenebis(2-methylcyclohexane-4,1-diyl))biscarbamate, (−)-N,N'-2,2-dicyclohexylpropane-4,4'-biscarbamate, N,N'-poly(hexamethylene biscarbamate), N,N'-octamethylene biscarbamate, N,N'-tolylene-α,4-biscarbamate, N,N'-poly(propylene glycol) tolylene-2,4-biscarbamate terminated, N,N'-poly(ethylene adipate) tolylene-2,4-biscarbamate terminated, N,N'-2,4,6-trimethyl-1,3-phenylene biscarbamate, N,N'-(4-chloro-6-methyl-1,3-phenylene) biscarbamate, N,N'-(poly[1,4-phenylene biscarbamate-co-poly(1,4-butanediol)]) biscarbamate, poly(tetrafluoroethylene oxide-co-difluoromethylene oxide) a, w-biscarbamate, N,N'-butane-1,4-diylbiscarbamate, N,N'-(1-methylethyl)benzene-1,3-biscarbamate, N,N'-3,3'-dimethyl-4,4'-biphenylene biscarbamate, N,N'-naphthalene-1,5-biscarbamate, N,N'-1,3-phenylene biscarbamate N,N'-benzene-1,4-biscarbamate, N,N'-2,4- or N,N'-2,5- or N,N'-2,6-biscarbamatotoluene or mixtures of these isomers, N,N'-4,4'-, N,N'-2,4'- or N,N'-2,2'-biscarbamatodiphenylmethane or mixtures of these isomers, N,N'-4,4'-, N,N'-2,4'- or N,N'-2,2'-biscarbamato-2,2-diphenylpropane-p-xylene and α,α,α',α'-tetramethyl-m- or -p-xylene biscarbamate.

In a more preferred embodiment of the invention the biscarbamate compound (A) is selected from the group consisting of N,N'-2,4-biscarbamatotoluene and N,N'-4,4'-Methylenebis(phenyl carbamate).

Biscarbamates can be obtained from the corresponding diisocyanates by reaction with the corresponding alcohol. The reaction of the biscarbamate with the alcohol can be performed in the same reactor as the polymerisation reaction or in a separate reactor.

Bisepoxide Compound (B)

In a preferred embodiment of the invention the bisepoxide compound (B) is selected from the group consisting of resorcinol diglycidyl ether, neopentyl glycol diglycidyl ether, 1,6-hexanediol diglycidyl ether, 1,4-butandiol diglycidyl ether, hydrogenated bisphenol-A diglycidyl ether, bisphenol-A diglycidyl ether, bisphenol-F diglycidyl ether, bisphenol-S digylcidyl ether, 9,9-bis(4-glycidyloxy phenyl) fluorine, tetrabromo bisphenol-A diglycidyl ether, tetrachloro bisphenol-A diglycidyl ether, tetramethyl bisphenol-A diglycidyl ether, tetramethyl bisphenol-F diglycidyl ether, tetramethyl bisphenol-S diglycidyl ether, diglycidyl terephthalate, diglycidyl o-phthalate, 1,4-cyclohexane dicarboxylic acid diglycidyl ester, ethylene glycol diglycidyl ether, polyethylene glycol diglycidyl ether, diethylene glycol diglycidyl ether, propylene glycol diglycidyl ether, dipropylene glycol diglycidyl ether, polypropylene glycol diglycidyl ether, polybutadiene diglycidyl ether, butadiene diepoxide, vinylcyclohexene diepoxide, limonene diepoxide, the diepoxides of double unsaturated fatty acid C1-C18 alkyl esters, 2-dihydroxybenzene diglycidyl ether, 1,4-dihydroxybenzene diglycidyl ether, 4,4'-(3,3,5-trimethylcyclohexyliden)bisphenyl diglycidylether and diglycidyl isophthalate.

In a more preferred embodiment of the invention the bisepoxide compound (B) is selected from the group consisting of bisphenol-A diglycidyl ether and resorcinol diglycidyl ether.

Compound (C)

In an embodiment of the invention the method for the production of the polyoxazolidinone compound is in the presence of the compound (C), wherein the compound (C) acts as a chain regulator for the polyoxazolidinone and further increases the thermal stability of the polyoxazolidinone The compound (C), comprising a mono-epoxide group and/or a compound comprising a mono-carbamate group and/or a mono-isocyanate group, preferably a mono-epoxide group and/or a compound comprising a mono-carbamate group.

In an embodiment of the invention the compound (C) is selected from the group consisting of N-phenyl carbamate, N-(o-tolyl) carbamate, N-(p-tolyl) carbamate, N-(4-chlorophenyl) carbamate, N-(1-naphthyl) carbamate, N-(2-naphthyl) carbamate, N-cyclohexyl carbamate, N-methyl carbamate, N-ethyl carbamate, N-(n-propyl) carbamate, N-isopropyl carbamate, N-butyl carbamate, N-pentyl carbamate N-hexyl carbamate and/or N-octyl carbamate, and/or phenyl glycidyl ether, o-kresyl glycidyl ether, m-kresyl glycidyl ether, p-kresyl glycidyl ether, 4-tert-butylphenyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidylether, C10-C18 alkyl glycidyl ether, allyl glycidyl ether, ethylene oxide, propylene oxide, styrene oxide, 1,2-butene oxide, 2,3-butene oxide, 1,2-hexene oxide, oxides of C10-C18 alpha-olefines, cyclohexene oxide, vinylcyclohexene monoxide, limonene monoxide, butadiene monoepoxide and/or N-glycidyl phthalimide and/or n-hexylisocyanate, 4-tert-butylphenyl glycidyl ether, cyclohexyl isocyanate, ω-chlorohexamethylene isocyanate, 2-ethyl hexyl isocyanate, n-octyl isocyanate, dodecyl isocyanate, stearyl isocyanate, methyl isocyanate, ethyl isocyanate, butyl isocyanate, isopropyl isocyanate, octadecyl isocyanate, 6-chloro-hexyl isocyanate, cyclohexyl isocyanate, 2,3,4-trimethylcyclohexyl isocyanate, 3,3,5-trimethylcyclohexyl isocyanatate, 2-norbornyl methyl isocyanate, decyl isocyanate, dodecyl isocyanate, tetradecyl isocyanate, hexadecyl isocyanate, octadecyl isocyanate, 3-butoxypropyl isocyanate, 3-(2-ethylhexyloxy)-propyl isocyanate, (trimethylsilyl)isocyanate, phenyl isocyanate, ortho-, meta-, para-tolyl isocyanate, chlorophenyl isocyanate (2,3,4-isomers), dichlorophenyl isocyanate, 4-nitrophenyl isocyanate, 3-trifluoromethylphenyl isocyanate, benzyl isocyanate, dimethylphenylisocyanate (technical mixture and individual isomers), 4-dodecylphenylisocyanat, 4-cyclohexyl-phenyl isocyanate, 4-pentyl-phenyl isocyanate, 4-t-butyl phenyl isocyanate, 1-naphthyl isocyanate, preferably N-(p-tolyl) carbamate, 4-tert-Butylphenyl glycidyl ether and p-tolyl isocyanate.

In a preferred embodiment of the invention the compound (C) is selected from the group consisting of 4-tert-butylphenyl glycidyl ether and N-(p-tolyl) carbamate.

Preferably, the molar amount of mono-epoxide and mono-carbamate compound added as compound (C) fulfils certain criteria with respect to the molar amount of bisepoxide compound (B) and biscarbamate compound (A). The ratio r is defined as the absolute value of the molar amount of compound (C) ($n_C$) to the difference between the molar amount of bisepoxide compound (B) ($n_{bisepoxide}$) and the molar amount of biscarbamate compound (A) ($n_{biscarbamate}$) according to the following formula (1)

$$r=|n_C/(n_{bisepoxide}-n_{biscarbamate})| \quad (1)$$

is preferably in the range of ≥1.5 to ≤2.5, more preferably in the range of ≥1.9 to ≤2.1, and particularly preferred in the range of ≥1.95 to ≤2.05. Without being bound to a theory, all epoxide groups and all carbamate groups will have reacted at the end of the reaction, when such an amount of chain regulator is being used.

The compound (C), preferably a compound comprising a mono-epoxide group and/or a compound comprising a mono-carbamate group, may be added to the reaction mixture at the beginning of the polymerisation reaction. The compound (C) may also be added during the reaction or after the reaction of bisepoxide and biscarbamate has been completed. In an alternative embodiment the mono-epoxide and/or mono-carbamate compound may be added in portions at different times of the reaction. Preferably the mono-epoxide and/or mono-carbamate compound is added at the beginning or during the polymerisation reaction of the bisepoxide and the biscarbamate.

As an alternative, an excess of a mono-epoxide and/or a mono-carbamate compound is added as chain regulator to the reaction mixture after the reaction between bisepoxide and biscarbamate has been completed. Without being bound to a theory, the terminal epoxide groups or the terminal carbamate groups resulting from the reaction of the bisepoxide and the biscarbamate will be converted to inert end groups by reaction with the regulator. The excess amount of regulator is subsequently removed from the product, e.g., by extraction, precipitation, distillation, stripping or thin film evaporation.

The molecular weight of the obtained polyoxazolidinone is determined by the molar ratio of the bisepoxide compound (B) relative to biscarbamate compound (A) and optionally relative to the compound (C).

Base (D)

As used herein, the term "base" is meant to denote a compound having an atom in the entire molecular framework, which is able to abstract an acidic proton from another organic compound, preferably this atom is a heteroatom such as N, O, P, S. Furthermore the base has a base strength pKb of ≤9, preferably ≤7, more preferred ≤5.3. In the case of polybasic compounds, the base strength of the first association step is used. The base strength can be determined from the dissociation constant pKa of the corresponding acid in aqueous solution at 25° C. and is obtained as pKb=14−pKa. To place the pKb value into perspective, NH3 has a pKb value of 4.79 and the OH— ion has a pKb value of −1.74.

Suitable bases are compounds, wherein the atom which is able to abstract an acidic proton from another organic compound is part of conjugated system and/or an aromatic ring. Examples for such bases are 1,8-diazabicyclo[5.4.0]undec-7-ene (DBU), 1,4-diazabicyclo[2.2.2]octane (DABCO), 1,5-diazabicyclo[4.3.0]non-5-ene (DBN), triazabicyclodecene (TBD). 6-(dibutylamino)-1,8-diazabicyclo[5.4.0]undec-7-ene and imidazoles such as 1,2-dimethylimidazole, 1-benzyl-2-phenylimidazole, 1-benzyl-2-methylimidazole, 2-undecylimidazole, 2-heptadecylimidazole, 2-ethyl-4-methylimidazole, 1-cyanoethyl-2-ethyl-4-methylimidazole, 1-cyanoethyl-2-methyl-imidazole and 2-phenylimidazole.

Another class of suitable bases are sterically hindered bases. As used herein, the term "sterically hindered base" is meant to denote a base compound, whereby the atom which is able to abstract an acidic proton from another organic compound is surrounded by sterically demanding groups.

Examples for sterically hindered bases are as diisopropylamine, N,N-diisopropylethylamine (DIPEA), 2,2,6,6-tetramethylpiperidine (TMP).

Another class of suitable bases are the phosphazene bases are strong non-metallic non-ionic and low-nucleophilic bases. Examples for phosphazene bases are hexachlorocyclotriphosphazene, bis(triphenylphosphine)iminium chloride, Tetramethyhtris(dimethylamino)-phosphoranylidene)-phosphorictriamid-Et-imin, tert-Octylimino-tris(dimethylamino)-phosphorane and tert-Butylimino-tri(pyrrolidino)phosphorane.

In a preferred embodiment of the invention the base (D) has a pKb-value of ≤7, wherein the base (D) is selected from the group consisting of 1,8-diazabicyclo[5.4.0]undec-7-ene (DBU), 1,4-diazabicyclo[2.2.2]octane (DABCO), 1,5-diazabicyclo[4.3.0]non-5-ene (DBN), triazabi-cyclodecene (TBD) and tert-Butylimino-tri(pyrrolidino)phosphorane.

Preferred bases with a base strength pKb of ≤5.3 in the process according to the invention are compounds selected from the group consisting of 1,8-diazabicyclo[5.4.0]undec-7-ene (DBU), 1,4-diazabicyclo[2.2.2]octane (DABCO), 1,5-diazabicyclo[4.3.0]non-5-ene (DBN), triazabi-cyclodecene (TBD) and tert-Butylimino-tri(pyrrolidino)phosphorane.

In a more preferred embodiment of the invention the base (D) is selected from the group consisting 1,8-diazabicyclo[5.4.0]undec-7-ene (DBU), 1,4-diazabicyclo[2.2.2]octane (DABCO), 1,5-diazabicyclo[4.3.0]non-5-ene (DBN), triaz-abicyclodecene (TBD) and hexachlorocyclo-triphospha-zene, bis(triphenylphosphine)iminium chloride, tetramethyl(tris(dimethylamino)-phosphoranylidene)-phosphorictriamid-Et-imin, tert-octylimino-tris(dimethylamino)-phosphorane and tert-Butylimino-tri(pyrrolidino)phosphorane and most preferred selected from the group consisting of 8-diazabicyclo[5.4.0]undec-7-ene (DBU), 1,4-diazabicyclo[2.2.2]octane (DABCO), and tert-Butylimino-tri(pyrrolidino)phosphorane.

In one embodiment of the method according to the invention, the base (D) is present in an amount of ≥0.001 to ≤5.0 weight-%, preferably in an amount of ≥0.01 to ≤1.0 weight-%, more preferred ≥0.05 to ≤0.6 weight-%, based on the theoretical yield of polyoxazolidinone.

Lewis Acid Catalyst (E)

As used herein, the term "Lewis acid" follows the definition given by IUPAC as a molecular entity (and the corresponding chemical species) that is an electron-pair acceptor and therefore able to react with a Lewis base to form a Lewis adduct, by sharing the electron pair furnished by the Lewis base. Hence, the Lewis acid catalyst may be a metal ion or a metal ion complex within this definition. The corresponding Lewis base that accompanies the Lewis acid catalyst is preferably of low nucleophilicity. Examples include bromide, iodide, tetraphenylborate, hexafluorophosphate, triflate (trifluoromethanesulfonate) and tosylate (p-tolylsulfonate). Particularly preferred nucleophiles are characterised by a low nucleophilicity with a value on the CH3I scale (J. Am. Chem. Soc. 99:24 (1977) 7968) of ≥2.0, more preferred of ≥4.0.

In a preferred embodiment of the invention the Lewis acid catalyst (E) is selected from the group consisting of
Li(I), Rb(I), Cs(I), Ag(I), Au(I),
Mg(II), Ca(II), Sr(II), Ba(II), Dy(II), Yb(II), Cu(II), Zn(II), V(II), Mo(II), Mn(II), Fe(II), Co(II)
Ni(II), Pd(II), Pt(II), Ge(II), Sn(II),
Sc(III), Y(III), La(III), Ce(III), Pr(III), Nd(III), Sm(III), Eu(III), Gd(III), Tb(III), Dy(III), Ho(III),
Er(III), Tm(III), Yb(III), Lu(III), Hf(III), Nb(III), Ta(III), Cr(III), Ru(III), Os(III), Rh(III), Ir(III),
Al(III), Ga(III), In(III), Tl(III), Ge(III),
Ce(IV), Ti(IV), Zr(IV), Hf(IV), Nb(IV), Mo(IV), W(IV), Ir(IV), Pt(IV), Sn(IV), Pb(IV),
Nb(V), Ta(V), Bi(V),
Mo(VI), W(VI), and
compounds represented by the formula (II)

$$[M(R1)(R2)(R3)(R4)]+nYn- \quad (XX)$$

wherein M is nitrogen, phosphorous or antimony, preferred phosphorous
wherein (R1), (R2), (R3), (R4) are independently of one another selected from the group comprising linear or branched alkyl groups containing 1 to 22 carbon atoms, optionally substituted with heteroatoms and/or heteroatom containing substituents, cycloaliphatic groups containing 3 to 22 carbon atoms, optionally substituted with heteroatoms and/or heteroatom containing substituents, C1 to C3 alkyl-bridged cycloaliphatic groups containing 3 to 22 carbon atoms, optionally substituted with heteroatoms and/or heteroatom containing substituents and aryl groups containing 6 to 18 carbon atoms, optionally substituted with one or more alkyl groups containing 1 to 10 carbon atoms and/or heteroatom containing substituents and/or heteroatoms,
wherein Y is a halide, carbonate, nitrate, sulfate or phosphate anion, more preferred a halide or carbonate and
wherein n is an integer of 1, 2 or 3.

In a more preferred embodiment of the invention the Lewis acid catalyst (E) is selected from the group consisting of LiCl, LiBr, SmI$_3$, Ph$_4$SbBr, Ph$_4$SbCl, Ph$_4$PBr, Ph$_4$PCl, Ph$_3$(C$_6$H$_4$—OCH$_3$)PBr, Ph$_3$(C$_6$H$_4$—OCH$_3$)PCl, Ph$_3$(C$_6$H$_4$F)PCl and Ph$_3$(C$_6$H$_4$F)PBr.

In one embodiment of the method according to the invention, the Lewis acid catalyst (E) is present in an amount of ≥0.001 to ≤5.0 weight-%, preferably in an amount of ≥0.01 to ≤3.0 weight-%, more preferred ≥0.05 to ≤0.2 weight-%, based on the theoretical yield of polyoxazolidinone.

In one embodiment of the invention the molar ratio of the base (D) to the sum of the base (D) and the Lewis acid catalyst (E) is from >0 mol-% to <100 mol-%, preferred from 10 mol-% to 90 mol-%, more preferred from 25 mol-% to 75 mol-% and most preferred from 30 mol-% to <60 mol-%.

For the process according to the invention it has further been shown that the reaction is performed at a temperature of ≥100° C. to ≤300° C., preferably of ≥130° C. to ≤280° C., more preferably of ≥140 to ≤250° C. If temperatures below 100° C. are set, the reaction is generally very slow. At temperatures above 300° C., the amount of undesirable secondary products increases considerably.

In a preferred embodiment of the invention the reaction is carried out under a reduced pressure (absolute) of ≥10 mbar to ≤1000 mbar, preferably ≥20 mbar to ≤800 mbar, most preferably from ≥50 mbar to ≤500 mbar. In an alternative embodiment, the reaction mixture is stripped by passing a stream of inert gas, such as nitrogen, argon through the reaction mixture. Without being bound to a theory, carrying out the reaction under a reduced pressure or stripping the reaction mixture with an inert gas removes the alcohol released during condensation reaction from the reaction mixture, which leads to reduced side reactions such as the homopolymerisation of epoxide groups which leads to cross linking of the polymer chains.

In one embodiment of the invention the reaction is performed in high boiling non-protic halogenated aromatic or high-boiling non-protic aliphatic heterocyclic solvents a halogenated aromatic or aliphatic heterocyclic solvent.

Suitable solvents are for example organic solvents such as linear or branched alkanes or mixtures of alkanes, toluene, xylene and the isomeric xylene mixtures, mesitylene, mono or polysubstituted halogenated aromatic solvents or halogenated alkane solvents, for example chlorobenzene, dichlorobenzene, dichloromethane, dichloroethane, tetrachloroethane, linear or cyclic ether such as tetrahydrofurane (THF) or methyl-tert-butylether (MTBE), linear or cyclic ester, or polar aprotic solvents such as 1,4-dioxane, acetonitrile, N,N-dimethylformamide (DMF), N,N-dimethylacetamide (DMAc), dimethylsulfoxid (DMSO), cyclic carbonate, such as ethylencarbonate or propylencarbonate, N methylpyrrolidone (NMP), sulfolane, tetramethylurea, N,N'-dimethylethylenurea or mixtures of the above mentioned solvents and/or with other solvents. Preferred solvents are 1,2-dichlorobenzene and N methylpyrrolidone (NMP).

The molar ratio of bisepoxide compound (B) to biscarbamate compound (A) is preferably in the range from 1:2 to 2:1, more preferably in the range from 45:55 to 2:1 and even more preferably in the range 47.8:52.2 to 52.2:47.8. When the bisepoxide compound (B) is employed in excess, preferably a mono-carbamate is employed as compound (C). When the biscarbamate compound (A) is employed in excess, preferably a mono-epoxide is employed as compound (C).

The reaction time for the polymerisation is for example 0.05 to 120 hours, preferably 0.5 to 48 hours, more preferred 1 to 24 hours. The reaction time is the time wherein the bisepoxide, the biscarbamate, the compound (C), the base catalyst and if applicable a solvent are in direct contact at the reaction temperature.

The present invention is further related to the polyoxazolidinone compound, obtainable by a method according to the invention. The resulting polyoxazolidinone compound according to exhibits a molar ratio of the 5-substituted 1,3-oxazolidin-2-one regioisomer to the 4-substituted 1,3-oxazolidin-2-one regioisomer of ≥0/1 to ≤100/1, preferred ≥0.3/1 to ≤20/1 and more preferred ≥0.5/1 to ≤5/1.

Preferably, the precise content of epoxide and carbamate groups in the bisepoxide, biscarbamate, monoepoxide and bisepoxide compound are determined before the polymerisation reaction. This can be achieved, e.g., by measuring the epoxide number according to German standard norm DIN EN 1877-1 and by confirming the purity of the carbamate compounds by NMR.

The present invention further relates to a spun fiber, comprising a polyoxazolidinone compound according to the invention and a textile, comprising such a spun fiber.

The method according to the invention is suited for the synthesis of oxazolidinone compounds with interesting properties for use, for example, as pharmaceutics or antimicrobiotics. Polyoxazolidinones obtained by the method according to the invention are particularly suited as polymer building blocks in polyurethane chemistry. For example, epoxy-terminated oligomeric oxazolidinones (oligooxazolidinones) may be reacted with polyols or polyamines to form foams or thermosets. Such epoxy-terminated oligomeric oxazolidinones are also suited for the preparation of composite materials. Epoxy-terminated oligomeric oxazolidinones (oligooxazolidinones) may also be reacted with their NCO-terminated counterparts to form high molecular weight polyoxazolidinones, which are useful as transparent, high temperature-stable materials. Polyoxazolidinones with high molecular weight obtained by the method according to the invention are particularly suited as transparent, high temperature-stable thermoplastic materials.

The conventional additives for these thermoplastics, such as fillers, UV stabilizers, heat stabilizers, antistatics and pigments, can also be added in the conventional amounts to the polyoxazolidinones according to the invention; the mould release properties, the flow properties and/or the flame resistance can optionally also be improved by addition of external mould release agents, flow agents and/or flame-proofing agents (e.g. alkyl and aryl phosphites and phosphates, alkyl- and arylphosphanes and low molecular weight carboxylic acid alkyl and aryl esters, halogen compounds, salts, chalk, quartz flour, glass fibres and carbon fibres, pigments and a combination thereof. Such compounds are described e.g. in WO 99/55772, p. 15-25, and in the corresponding chapters of the "Plastics Additives Handbook", ed. Hans Zweifel, 5th edition 2000, Hanser Publishers, Munich).

The polyoxazolidinones according to the invention, optionally in a mixture with other thermoplastics, such as, for example, graft polymers based on acrylonitrile/butadiene/styrene or graft copolymers based on acrylate rubber (see, for example, the graft polymers described in EP-A 640 655) and/or conventional additives, when processed to any desired shaped articles/extrudates, can be employed in all instances where polycarbonates, polyester carbonates and polyesters which are already known are employed. Further possible uses of the polyoxazolidinones according to the invention are:

1. Safety panes, which as is known are required in many areas of buildings, vehicles and aircraft, and also as visors of helmets.
2. Production of films, in particular films for skis.
3. Production of blow-moulded articles (see also U.S. Pat. No. 2,964,794), for example 1 to 5 gallon water bottles.
4. Production of transparent sheets, in particular hollow chamber sheets, for example for covering buildings such as railway stations, greenhouses and lighting installations.
5. Production of optical data storage media.
6. For production of traffic light housings or traffic signs.
7. For production of foams (see, for example, DE-B 1 031 507).
8. For production of threads and wires (see, for example, DE-B 1 137 167 and DE-A 1 785 137).
9. As translucent plastics with a content of glass fibres for lighting purposes (see, for example, DE-A 1 554 020).
10. As translucent plastics with a content of barium sulfate, titanium dioxide and/or zirconium oxide or organic polymeric acrylate rubbers (EP-A 0 634 445, EP-A 269324) for the production of transparent and light-scattering mouldings.
11. For the production of precision injection mouldings, such as, for example, lens holders. Polyoxazolidinones with a content of glass fibres which optionally additionally contain about 1 to 10 wt. % of $MoS_2$, based on the total weight, are used for this purpose.
12. For the production of optical equipment components, in particular lenses for photographic and film cameras (see, for example, DE-A 2 701 173).
13. As light transmission carriers, in particular as light conductor cables (EP-A 0 089 801).
14. As electrical insulating materials for electrical conductors and for plug housings and plug connectors.
15. Production of mobile telephone housings with improved resistance to perfume, shaving lotion and skin perspiration.
16. Network interface devices.
17. As a carrier material for organic photoconductors.
18. For the production of lamps, e.g. searchlights, as so-called headlamps, light-diffusing panes or internal lenses, as well as long-distance lamps.
19. For medical uses, such as e.g. oxygenators, dialyzers.
20. For foodstuffs uses, such as e.g. bottles, utensils and chocolate moulds.
21. For uses in the automobile field where contact with fuels and lubricants may occur, such as, for example, bumpers, optionally in the form of suitable blends with ABS or suitable rubbers.
22. For sports articles, such as e.g. slalom poles or ski boot buckles.
23. For household articles, such as e.g. kitchen sinks and letterbox housings.

24. For housings, such as e.g. electrical distribution boxes
25. Housings for electric toothbrushes and hairdryer housings.
26. Transparent washing machine portholes with improved resistance to the wash solution.
27. Safety glasses, visors or optical corrective glasses.
28. Lamp covers for kitchen equipment with improved resistance to kitchen fumes, in particular oil vapours.
29. Packaging films for medicaments.
30. Chip boxes and chip supports.
31. For other uses, such as e.g. fattening stable doors or animal cages.
32. Safety helmets This Application likewise provides the shaped articles and mouldings and extrudates from the polymers according to the invention

EXAMPLES

Carbamate Compound (A)
TDC N,N'-2,4-biscarbamatotoluene, difunctional carbamate, prepared by reaction of toluene-2,4-diisocyanate with methanol
MDC N,N'-4,4'-Methylenebis(phenyl carbamate, difunctional carbamate, prepared by reaction of 4,4'-methylendiphenyl-1,1'-diisocyanate with methanol
Epoxide Compound (B)
BADGE 2-[[4-[2-[4-(Oxiran-2-ylmethoxy)phenyl]propan-2-yl]phenoxy]methyl]oxirane (Bisphenol-A-diglycidylether), difunctional epoxide
RDE Resorcinol diglycidylether, difunctional epoxide
Compound (C)
BPGE tert-Butylphenylglycidylether, monofunctional epoxide
Base (D)
DBU 1,8-diazabicyclo[5.4.0]undec-7-ene
BTPP tert-butylimino-tri(pyrrolidino)phosphorane (Phosphazene base P1-t-Bu-tris(tetramethylene)
Lewis Acid Catalyst (E)
$Ph_4SbBr$ tetraphenylstibonium bromide
Solvents
NMP N-methyl-2-pyrrolidinone
oDCB ortho-dichlorobenzene TDC and MDC are synthesised from the corresponding isocyanates. Anhydrous NMP (99.5%), anhydrous oDCB (99%), DBU (98%), BTPP (97%) and $Ph_4SbBr$ (97%) were all purchased from Sigma Aldrich and used as obtained without further purification. RDE (Denacol Ex-201) and BPGE (Denacol Ex-146) were purchased from Nagase Chemtex Corporation and used as obtained without further purification. BADGE (Epikote 162) was purchased from Hexion and used as obtained without further purification.
Synthesis of Polyoxazolidinone The glass Schlenk tubes (50 mL or 100 mL) used in the examples were fitted, close to the top, with three side arms. The lower part of the Schlenk tube was inserted into an electric heating jacket (510 Watt maximum heating power). A cylindrical magnetic stirring bar (PTFE, 10 mm long and 6 mm in diameter) was placed inside of the Schlenk tube. One opening of the Schlenk tube was connected to a water-cooled condenser. The alcohol evolved during the reaction was collected in a receiver flask cooled with ice. One opening of the Schlenk tube was closed with a plug. Two arms of the Schlenk tube were closed with rubber septa. A temperature probe (1 mm diameter and 15 cm length) was inserted through one of the septa in such a way that the tip became immersed in the reaction mixture once the Schlenk tube was charged with reagents. A gentle Argon-flow was established by passing Argon through a long needle, which was inserted through the second septum, into the lower part of the Schlenk tube. The Argon was released through a second needle. The oxazolidinone product was obtained as detailed below and analysed with IR and NMR spectroscopy.

The amount of base is stated in weight-% relative to the theoretical yield of polyoxazolidinone.
Characterisation of Polyoxazolidinone Solid state IR analyses were performed on a Bruker ALPHA-P IR spectrometer equipped with a diamond probe head. The software OPUS 6.5 was used for data treatment. A background spectrum was recorded against ambient air. Thereafter, a small sample of the polyoxazolidinone (2 milligrams) was applied to the diamond probe and the IR spectrum recorded averaging over 32 spectra obtained in the range of 4000 to 400 $cm^{-1}$ with a resolution of 4 $cm^{-1}$.

In the condensation reaction, 3,5-oxazolidin-2-one (5-oxazolidinone or 5-oxa) regioisomer according to the following formula is preferentially formed:

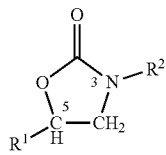

The 3,4-oxazolidin-2-one (4-oxazolidinone or 4-oxa) according to the following formula can also be obtained.

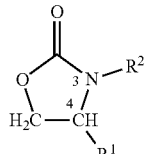

The ratio between 4-oxazolidinone and 5-oxazolidinone in the polyoxazolidinones is calculated by $^1H$ NMR with the ratio between the integrals of the methine proton on position 4 of the oxazolidinone ring (4-oxa) and the methine proton on position 5 (5-oxa) For NMR analysis, a sample of the oligomer (20 mg) was dissolved in deuterated dimethyl sulfoxide (0.5 mL) and measured on a Bruker spectrometer (AV400, 400 MHz).

Conversions of dicarbamate to polyoxazolidinone are calculated after 1 hr of reaction time by $^1HNMR$ analysis of the reaction mixture sample as follows:

Conversion %=integrals methine protons (4 and 5-oxa)*100/integrals (carbamate proton+methine protons (4 and 5-oxa)

The average chain length of the polyoxazolidinones was controlled by the molar ratio of bisepoxide, biscarbamate and/or compound (C).

The formula below gives a general mathematical formula to calculate the average chain length n in the oligomeric product obtained with a monocarbamate or monoisocyanate as compound (C):

$$n=1/[\{(n_{bisepoxide})/(n_{biscarbamate})\}-1]$$

whereby $n_{bisepoxide}$ is the molar amount of bisepoxide and $n_{biscarbamate}$ is the molar amount of biscarbamate.

The formula below gives a general mathematical formula to calculate the average chain length n in the oligomeric product obtained with a monoepoxide as compound (C):

$$n = 1/[\{(n_{biscarbamate})/(n_{bisepoxide})\} - 1]$$

whereby $n_{biscarbamate}$ is the molar amount of biscarbamate and $n_{bisepoxide}$ is the molar amount of bisepoxide.

The ratio r defined as the absolute value of the molar amount of compound (C) ($n_c$) to the difference between the molar amount of bisepoxide ($n_{bisepoxide}$) and the molar amount of biscarbamate ($n_{biscarbamate}$) according to formula (VIII) was 2.

The stability of the polyoxazolidinones was characterized by thermogravimetric analysis (TGA). The measurements were performed on a Mettler Toledo TGA/DSC 1. The sample (6 to 20 mg) was weighed in a 70 μL Alox pan (previously cleaned at 1000° C. for 7 hrs), heated from 25° C. to 600° C. with a heating rate of 10 K/min under argon flow (35 mL/min) and the relative weight loss was followed in dependence of temperature. For data analysis the software STAR$^e$ SW 11.00 was used. The decomposition temperature ($T_d$) stated is the onset point determined from the step tangent of the sinusoidal weight loss curve.

The dynamic viscosity of polymer solution (2 g/L in DMAc at 20° C.) were measured on an Anton Paar microviscosimeter Lovis 2000 M E. The method used was Lovis/DMA using a steel ball and a borosilicate capillary with a 1.59 mm diameter.

Example 1: Oligomerization of MDC and BADGE with BPGE as Compound (C) Using BTPP and Ph$_4$SbBr as Catalyst (Target n=10)

A 50 mL Schlenk tube was charged with MDC (5.62 g, 17.9 mmol) and BADGE (5.73 g, 16.4 mmol), closed and inertised with argon. Then oDCB (20 mL) was added. The mixture was stirred (400 rpm) and heated to 180° C. BTPP (55 μL, 1 mol % relative to biscarbamate) and Ph$_4$SbBr (0.18 g, 2 mol % relative to biscarbamate) were added. After 480 min, 10 mL of oDCB were added and an excess of BPGE (1.5 ml, 6 mmol) was added. After another 60 min, the reaction mixture was allowed to cool to room temperature.

Analysis of the reaction mixture by $^1$H NMR spectroscopy showed complete conversion of the carbamate groups.

The polyoxazolidinone was precipitated with methanol, collected by filtration, washed with diethylether, dried under vacuum and analysed.

In the solid state IR spectrum the characteristic signal for the oxazolidinone carbonyl group was observed at 1747 cm$^{-1}$.

In the solid state IR spectrum the characteristic signal for isocyanurate groups was not observed.

In the $^1$H NMR spectrum, the characteristic methine and methylene signals assigned to the oxazolidinone moieties were observed.

Integration of the NMR signals showed that the chemoselectivity to oxazolidinone was >98.0%.

The content of the 5-oxazolidinone regioisomer was 50% and the content of the 4-oxazolidinone was 50%.

The polyoxazolidinone compound was thermally stable until 393.5° C.

Dynamic viscosity was 1.140 mPa·s$^{-1}$.

Conversion of carbamate to oxazolidinone after 1 h is 60%.

Example 2 (Comparison): Polymerization of MDC and BADGE with BPGE as Compound (C) Using DBU as Catalyst (Target n=10)

A 25 mL Schlenk tube was charged with MDC (1.99 g, 6.4 mmol) and BADGE (1.97 g, 5.8 mmol), closed and inertised with argon. Then, NMP (16 mL) was added. The mixture was stirred (400 rpm) and heated to 180° C. DBU (12.8 mg, 1 mol % relative to biscarbamate, 0.35 weight-% relative to polyoxazolidinone) was added. After 195 min, 4BPGE (0.5 mL, 2.3 mmol) was added. After another 60 min, the reaction mixture was allowed to cool to room temperature.

Analysis of the reaction mixture by NMR spectroscopy showed complete conversion of the carbamate groups.

The polyoxazolidinone was precipitated with methanol, collected by filtration, washed with diethylether, dried under vacuum and analysed.

In the solid state IR spectrum the characteristic signal for the oxazolidinone carbonyl group was observed at 1747 cm$^{-1}$.

In the solid state IR spectrum the characteristic signal for isocyanurate groups was not observed.

In the $^1$H NMR spectrum, the characteristic signals for carbamate and epoxide groups were not observed.

In the $^1$H NMR spectrum, the characteristic methine and methylene signals assigned to the oxazolidinone moieties were observed at 4.9 ppm and 4.1 ppm.

Integration of the NMR signals showed that the chemoselectivity to oxazolidinone was >98.0%.

The content of the 5-oxazolidinone regioisomer was >99.9%.

The polyoxazolidinone compound was thermally stable until 375° C.

Dynamic viscosity was 1.112 mPa·s$^{-1}$.

Example 3: Oligomerization of MDC and RDE with BPGE as Compound (C) Using BTPP and Ph$_4$SbBr as Catalyst (Target n=10)

A 50 mL Schlenk tube was charged with MDC (5.62 g, 17.9 mmol) and RDE (3.65 g, 16.4 mmol), closed and inertised with argon. Then, oDCB (20 mL) was added. The mixture was stirred (400 rpm) and heated to 180° C. BTPP (55 μL, 1 mol % relative to biscarbamate) and Ph$_4$SbBr (0.18 g, 2 mol % relative to biscarbamate) were added. After 480 min, 10 mL of oDCB and 5 mL of NMP were added and an excess of BPGE (1.5 mL, 6 mmol) was added. After another 60 min, the reaction mixture was allowed to cool to room temperature.

Analysis of the reaction mixture by NMR spectroscopy showed complete conversion of the carbamate groups.

The polyoxazolidinone was precipitated with methanol, collected by filtration, washed with diethylether, dried under vacuum and analysed.

In the solid state IR spectrum the characteristic signal for the oxazolidinone carbonyl group was observed at 1747 cm$^{-1}$.

In the solid state IR spectrum the characteristic signal for isocyanurate groups was not observed.

In the $^1$H NMR spectrum, the characteristic methine and methylene signals assigned to the oxazolidinone moieties were observed.

Integration of the NMR signals showed that the chemoselectivity to oxazolidinone was >98.0%.

The content of the 5-oxazolidinone regioisomer was 50% and the content of the 4-oxazolidinone was 50%.

The polyoxazolidinone compound was thermally stable until 368° C.

Dynamic viscosity was 1.164 mPa·s$^{-1}$.

Example 4 (Comparison): Polymerization of MDC and RDE with BPGE as Compound (C) Using DBU as Catalyst (Target n=10)

A 100 mL Schlenk tube was charged with MDC (6.91 g, 22 mmol) and RDE (4.45 g, 20 mmol), closed and inertised with argon. Then, NMP (45 mL) was added. The mixture was stirred (400 rpm) and heated to 180° C. DBU (33.5 mg, 1 mol % relative to biscarbamate, 0.26 weight-% relative to polyoxazolidinone) was added. After 300 min, BPGE (1 mL, 4.6 mmol) was added. After another 60 min, the reaction mixture was allowed to cool to room temperature.

Analysis of the reaction mixture by $^1$H NMR spectroscopy showed complete conversion of the carbamate groups.

The polyoxazolidinone was precipitated with methanol, collected by filtration, washed with methanol, dried under vacuum and analysed.

In the solid state IR spectrum the characteristic signal for the oxazolidinone carbonyl group was observed at 1747 cm$^{-1}$.

In the solid state IR spectrum the characteristic signal for isocyanurate groups was not observed.

In the $^1$H NMR spectrum, the characteristic signals for carbamate and epoxide groups were not observed.

In the $^1$H NMR spectrum, the characteristic methine and methylene signals assigned to the oxazolidinone moieties were observed at 4.9 ppm and 4.1 ppm.

Integration of the NMR signals showed that the chemoselectivity to oxazolidinone was >98.0%.

The content of the 5-oxazolidinone regioisomer was >99.9%.

The polyoxazolidinone compound was thermally stable until 355° C.

Dynamic viscosity was 1.112 mPa·s$^{-1}$.
Comparison 180 min, BPGE (0.5 mL, 2.3 mmol) was added. After another 60 min, the reaction mixture was allowed to cool to room temperature.

Analysis of the reaction mixture by $^1$H NMR spectroscopy showed uncomplete conversion of the carbamate groups.

In the solid state IR spectrum the characteristic signals for isocyanurate and urea groups were observed.

Conversion of carbamate to oxazolidinone after 1 h is 9%.

Example 6 (Comp): Oligomerization of MDC and BADGE with BPGE as Compound (C) Using BTPP as Catalyst (Target n=10)

A 50 mL Schlenk tube was charged with MDC (5.62 g, 17.9 mmol) and BADGE (5.73 g, 16.4 mmol), closed and inertised with argon. Then, oDCB (20 mL) was added. The mixture was stirred (400 rpm) and heated to 180° C. BTPP (55 µL, 1 mol % relative to biscarbamate) was added. After 480 min, 10 mL of oDCB were added and an excess of BPGE (1.5 mL, 6 mmol) was added. After another 60 min, the reaction mixture was allowed to cool to room temperature.

Analysis of the reaction mixture by NMR spectroscopy showed complete conversion of the carbamate groups.

The polyoxazolidinone was precipitated with methanol, collected by filtration, washed with diethylether, dried under vacuum and analysed.

TABLE 1

Comparison of the results of Examples 1, 2, 3 and 4

| Example | Diepoxide | Catalyst | Ratio 4-OXA:5-OXA | Decomposition Temperature (° C.) | Dynamic viscosity (mPa · s$^{-1}$) |
|---|---|---|---|---|---|
| 1 | BADGE | Base (D) + Lewis Acid (E) | 1:1 | 394 | 1.140 |
| 2 (Comp.) | BADGE | Base (D) | 0:1 | 375 | 1.112 |
| 3 | RDE | Base (D) + Lewis Acid (E) | 1:1 | 368 | 1.164 |
| 4 (Comp.) | RDE | Base (D) | 0:1 | 355 | 1.112 |

(Comp.): comparison example

A comparison of examples 1 with comparison example 2 and a comparison of examples 3 with comparison example 4 show that the polyoxazolidinone products obtained with the use of a combination of catalyst (base+Lewis acid) according to this invention (examples 1 and 3) have a higher content of 4-OXA leading to a higher dynamic viscosity and a higher decomposition temperature compared to a polyoxazolidinone product obtained without the use of a combination of catalyst (comparison examples 2 and 4).

Example 5 (Comp.): Polymerization of MDC and BADGE with BPGE as Compound (C) Using Ph$_4$SbBr as Catalyst (Target n=10)

A 25 mL Schlenk tube was charged with MDC (2.00 g, 6.36 mmol) and BADGE (1.97 g, 5.78 mmol), closed and inertised with argon. Then, NMP (16 mL) was added. The mixture was stirred (400 rpm) and heated to 180° C. Ph$_4$SbBr (64.9 mg, 2 mol % relative to biscarbamate, 1.54 weight-% relative to polyoxazolidinone) was added. After In the solid state IR spectrum the characteristic signal for the oxazolidinone carbonyl group was observed at 1747 cm$^{-1}$. Analysis of the reaction mixture by NMR spectroscopy showed uncomplete conversion of the carbamate groups.

In the solid state IR spectrum the characteristic signal for isocyanurate groups was not observed.

In the $^1$H NMR spectrum, the characteristic methine and methylene signals assigned to the oxazolidinone moieties were observed.

Integration of the NMR signals showed that the chemoselectivity to oxazolidinone was >98.0%.

The content of the 5-oxazolidinone regioisomer was >99.9%.

The polyoxazolidinone compound was thermally stable until 395° C.

Conversion of carbamate to oxazolidinone after 1 h is 9%.

Comparison

TABLE 2

Comparison of the results of examples 1, 5 and 6

| Example | Catalyst | Conversion of carbamate to polyoxazolidinone [%] | Ratio 4-OXA:5-OXA | Conversion of Carbamate after 1 h [%] |
|---|---|---|---|---|
| 1 | Phosphazene (D) + Ph$_4$SbBr (E) | >99.9 | 1:1 | 60 |
| 5 (comp.) | Ph$_4$SbBr (E) | 50 | 0.25:1 | 9 |
| 6 (comp.) | Phosphazene (D) | 50 | 0:1 | 9 |

(comp.): comparison example

Comparison examples 5 and 6 demonstrate that the polyoxazolidinone product according to the invention can only be obtained by using a combination of base and Lewis acid catalysts.

The invention claimed is:

1. A method for the production of polyoxazolidinone compounds, comprising reacting (A) at least one biscarbamate compound with (B) at least one bisepoxide compound in the presence of (D) at least one base, (E) at least one Lewis acid catalyst, and optionally (C) at least one compound which comprises at least one of a mono-carbamate group, a mono-isocyanate group, and a mono-epoxide group, and (D) the base has a pK$_b$-value of ≤9.

2. The method according to claim 1, wherein the method comprises:
  (α) adding (A) the biscarbamate compound to (B) the bisepoxide compound in a continuous or step-wise manner with two or more individual addition steps in the step-wise addition and in each individual addition step the amount of (A) the biscarbamate compound added is ≥0.1 weight-% to ≤50 weight-% of the total amount of the biscarbamate compound (A) to be added, or
  (β) adding (A) the biscarbamate compound and (B) the bisepoxide compound at the same time to a reactor, optionally, comprising (D) the at least one base and (E) at least one Lewis acid catalyst, and/or a solvent in a continuous or step-wise manner with two or more individual addition steps in the step-wise addition, or
  (γ) charging (A) the biscarbamate compound, (B) the bisepoxide compound, optionally, (C) the compound which comprises at least one of a mono-carbamate group, a mono-isocyanate group, and a mono-epoxide group, (D) the base, and (E) the Lewis acid catalyst and, if applicable, a solvent to a reactor and running the reaction until full conversion is obtained.

3. The method according to claim 1, wherein (A) the biscarbamate compound comprises at least one of N,N'-tetramethylene biscarbamate, N,N'-hexamethylene biscarbamate, N,N'-(2-methylpentamethylene) biscarbamate, N,N'-2,2,4-trimethyl-hexamethylene biscarbamate, N,N'-dodecanemethylene biscarbamate, N,N'-cyclohexane-1,4-biscarbamate, N,N'-isophorone biscarbamate, N,N'-(4,4'-methylenebis(cyclohexane-4,1-diyl)biscarbamate, N,N'-diphenylmethane biscarbamate, N,N'-(4,4'-methylenebis(2-methylcyclohexane-4,1-diyl))biscarbamate, (–)-N,N'-2,2-dicyclohexylpropane-4,4'-biscarbamate, N,N'-poly(hexamethylene biscarbamate), N,N'-octamethylene biscarbamate, N,N'-tolylene-α,4-biscarbamate, N,N'-poly(propylene glycol) tolylene-2,4-biscarbamate terminated, N,N'-poly(ethylene adipate) tolylene-2,4-biscarbamate terminated, N,N'-2,4,6-trimethyl-1,3-phenylene biscarbamate, N,N'-(4-chloro-6-methyl-1,3-phenylene) biscarbamate, N,N'(poly[1,4-phenylene biscarbamate-co-poly(1,4-butanediol)]) biscarbamate, poly(tetrafluoroethylene oxide-co-difluoromethylene oxide) α,ω-biscarbamate, N,N'-butane-1,4-diylbiscarbamate, N,N'-(1-methylethyl)benzene-1,3-biscarbamate, N,N'-3,3'-dimethyl-4,4'-biphenylene biscarbamate, N,N'-naphthalene-1,5-biscarbamate, N,N'-1,3-phenylene biscarbamate, N,N'-benzene-1,4-biscarbamate, N,N'-2,4- or N,N'-2,5- or N,N'-2,6-biscarbamatotoluene or mixtures of these isomers, N,N'-4,4'-, N,N'-2,4'- or N,N'-2,2'-biscarbamatodiphenylmethane or mixtures of these isomers, N,N'-4,4'-, N,N'-2,4'- or N,N'-2,2'-biscarbamato-2,2-diphenylpropane-p-xylene and α,α,α',α'-tetramethyl-m- or -p-xylene biscarbamate.

4. The method according to claim 1, wherein (B) the bisepoxide compound comprises at least one of resorcinol diglycidyl ether, neopentyl glycol diglycidyl ether, 1,6-hexanediol diglycidyl ether, 1,4-butanediol diglycidyl ether, hydrogenated bisphenol-A diglycidyl ether, bisphenol-A diglycidyl ether, bisphenol-F diglycidyl ether, bisphenol-S digylcidyl ether, 9,9-bis(4-glycidyloxy phenyl)fluorine, tetrabromo bisphenol-A diglycidyl ether, tetrachloro bisphenol-A diglycidyl ether, tetramethyl bisphenol-A diglycidyl ether, tetramethyl bisphenol-F diglycidyl ether, tetramethyl bisphenol-S diglycidyl ether, diglycidyl terephthalate, diglycidyl o-phthalate, 1,4-cyclohexane dicarboxylic acid diglycidyl ester, ethylene glycol diglycidyl ether, polyethylene glycol diglycidyl ether, diethylene glycol diglycidyl ether, propylene glycol diglycidyl ether, dipropylene glycol diglycidyl ether, polypropylene glycol diglycidyl ether, polybutadiene diglycidyl ether, butadiene diepoxide, vinylcyclohexene diepoxide, limonene diepoxide, the diepoxides of double unsaturated fatty acid $C_1$-$C_{18}$ alkyl esters, 2-dihydroxybenzene diglycidyl ether, 1,4-dihydroxybenzene diglycidyl ether, 4,4'-(3,3,5-trimethylcyclohexyliden)bisphenyl diglycidylether, and diglycidyl isophthalate.

5. The method according to claim 1, wherein (C) the compound comprises at least one of N-phenyl carbamate, N-(o-tolyl) carbamate, N-(p-tolyl) carbamate, N-(4-chlorophenyl) carbamate, N-(1-naphthyl) carbamate, N-(2-naphthyl) carbamate, N-cyclohexyl carbamate, N-methyl carbamate, N-ethyl carbamate, N-(n-propyl) carbamate, N-isopropyl carbamate, N-butyl carbamate, N-pentyl carbamate N-hexyl carbamate and/or N-octyl carbamate, and/or phenyl glycidyl ether, o-kresyl glycidyl ether, m-kresyl glycidyl ether, p-kresyl glycidyl ether, 4-tert-butylphenyl glycidyl ether, 1-naphthyl glycidyl ether, 2-naphthyl glycidyl ether, 4-chlorophenyl glycidyl ether, 2,4,6-trichlorophenyl glycidyl ether, 2,4,6-tribromophenyl glycidyl ether, pentafluorophenyl glycidyl ether, cyclohexyl glycidyl ether, benzyl glycidyl ether, glycidyl benzoate, glycidyl acetate, glycidyl cyclohexylcarboxylate, methyl glycidyl ether, ethyl glycidyl ether, butyl glycidyl ether, hexyl glycidyl ether, 2-ethylhexyl glycidyl ether, octyl glycidylether, $C_{10}$-$C_{18}$ alkyl glycidyl ether, allyl glycidyl ether, ethylene oxide, propylene oxide, styrene oxide, 1,2-butene oxide, 2,3-butene oxide, 1,2-hexene oxide, oxides of $C_{10}$-$C_{18}$ alpha-olefines, cyclohexene oxide, vinylcyclohexene monoxide, limonene monoxide, butadiene monoepoxide and/or N-glycidyl phthalimide and/or n-hexylisocyanate, 4-tert-butylphenyl glycidyl ether, cyclohexyl isocyanate, ω-chlorohexamethylene isocyanate, 2-ethyl hexyl isocyanate, n-octyl isocyanate, dodecyl isocyanate, stearyl isocyanate, methyl isocyanate, ethyl isocyanate, butyl isocyanate, isopropyl isocyanate, octadecyl isocyanate, 6-chloro-hexyl isocyanate, cyclohexyl isocyanate, 2,3,4-trimethylcyclohexyl isocyanate, 3,3,5-trimethylcyclohexyl isocyanate, 2-norbornyl methyl isocyanate, decyl isocyanate, dodecyl isocyanate, tetradecyl isocyanate, hexadecyl isocyanate, octadecyl isocyanate, 3-butoxypropyl isocyanate, 3-(2-ethylhexyloxy)-propyl isocyanate, (trimethylsilyl)isocyanate, phenyl isocyanate, ortho-, meta-, para-tolyl isocyanate, chlorophenyl isocyanate (2,3,4-isomers), dichlorophenyl isocyanate, 4-nitrophenyl isocyanate, 3-trifluoromethylphenyl isocyanate, benzyl isocyanate, dimethylphenylisocyanate (technical mixture and individual isomers), 4-dodecylphenylisocyanate, 4-cyclohexyl-phenyl isocyanate, 4-pentyl-phenyl isocyanate, 4-t-butyl phenyl isocyanate, and 1-naphthyl isocyanate.

6. The method according to claim 1, wherein the base (D) has a $pK_b$-value of ≤7.

7. The method according to claim 1, wherein (D) the base comprises at least one of 1,8-diazabicyclo[5.4.0]undec-7-ene (DBU), 1,4-diazabicyclo[2.2.2]octane (DABCO), 1,5-diazabicyclo[4.3.0]non-5-ene (DBN), triazabicyclodecene (TBD) and hexachlorocyclotriphosphazene, bis(triphenylphosphine)iminium chloride, tetramethyl(tris(dimethylamino)-phosphoranylidene)-phosphorictriamid-Et-imin, tert-octylimino-tris(dimethylamino)-phosphorane and tert-Butylimino-tri(pyrrolidino)phosphorane.

8. The method according to claim 1, wherein (E) the Lewis acid catalyst comprises at least one of Li(I), Rb(I), Cs(I), Ag(I), Au(I), Mg(II), Ca(II), Sr(II), Ba(II), Dy(II), Yb(II), Cu(II), Zn(II), V(II), Mo(II), Mn(II), Fe(II), Co(II)

Ni(II), Pd(II), Pt(II), Ge(II), Sn(II),

Sc(III), Y(III), La(III), Ce(III), Pr(III), Nd(III), Sm(III), Eu(III), Gd(III), Tb(III), Dy(III),

Ho(III),

Er(III), Tm(III), Yb(III), Lu(III), Hf(III), Nb(III), Ta(III), Cr(III), Ru(III), Os(III), Rh(III),

Ir(III),

Al(III), Ga(III), In(III), Tl(III), Ge(III),

Ce(IV), Ti(IV), Zr(IV), Hf(IV), Nb(IV), Mo(IV), W(IV), Ir(IV), Pt(IV), Sn(IV), Pb(IV),

Nb(V), Ta(V), Bi(V),

Mo(VI), W(VI), and compounds corresponding to the formula (XX)

$$[M(R1)(R2)(R3)(R4)]+n\ Yn- \qquad (XX)$$

wherein:

M: represents nitrogen, phosphorous or antimony wherein:

(R1), (R2), (R3), (R4) each independently of one another comprise unsubstituted linear or branched alkyl groups containing 1 to 22 carbon atoms, linear or branched alkyl groups containing 1 to 22 carbon atoms which are substituted with heteroatoms and/or heteroatom containing substituents, unsubstituted cycloaliphatic groups containing 3 to 22 carbon atoms, cycloaliphatic groups containing 3 to 22 carbon atoms which are substituted with heteroatoms and/or heteroatom containing substituents, unsubstituted $C_1$ to $C_3$ alkyl-bridged cycloaliphatic groups containing 3 to 22 carbon atoms, $C_1$ to $C_3$ alkyl-bridged cycloaliphatic groups containing 3 to 22 carbon atoms which are substituted with heteroatoms and/or heteroatom containing substituents, unsubstituted aryl groups containing 6 to 18 carbon atoms, and unsubstituted aryl groups containing 6 to 18 carbon atoms which are substituted with one or more alkyl groups containing 1 to 10 carbon atoms and/or heteroatom containing substituents and/or heteroatoms, Y represents a halide, carbonate, nitrate, sulfate or phosphate anion, and n represents an integer of 1, 2 or 3.

9. The method according to claim 1, wherein (E) the Lewis acid catalyst comprises at least one of LiCl, LiBr, SmI$_3$, Ph$_4$SbBr, Ph$_4$SbCl, Ph$_4$PBr, Ph$_4$PCl, Ph$_3$(C$_6$H$_4$—OCH$_3$)PBr, Ph$_3$(C$_6$H$_4$—OCH$_3$)PCl, Ph$_3$(C$_6$H$_4$F)PCl, and Ph$_3$(C$_6$H$_4$F)PBr.

10. The method according to claim 1, wherein the molar ratio of (D) the base to the sum of (D) the base and (E) the Lewis acid catalyst is from >10 mol-% to <100 mol-%.

11. The method according to claim 1, wherein the reaction is performed at reaction temperatures of ≥130° C. to ≤280° C.

12. The method according to claim 1, wherein the reaction is performed in high boiling non-protic halogenated aromatic solvent, a high-boiling non-protic aliphatic heterocyclic solvent, a halogenated aromatic solvent, or an aliphatic heterocyclic solvent.

13. A polyoxazolidinone compound obtained by the method according to claim 1, the polyoxazolidinone compound a molar ratio of the 5-substituted 1,3-oxazolidin-2-one regioisomer to the 4-substituted 1,3-oxazolidin-2-one regioisomer of ≥0.3/1 to ≤20/1.

14. Spun fiber comprising the polyoxazolidinone compound according to claim 13.

15. The method according to claim 10, wherein the molar ratio of (D) the base to the sum of (D) the base and (E) the Lewis acid catalyst is from 10 mol-% to 90 mol-%.

* * * * *